(12) United States Patent
Marriott et al.

(10) Patent No.: US 6,827,224 B2
(45) Date of Patent: Dec. 7, 2004

(54) FOOD LIQUID STRAINER FOR COOKING

(75) Inventors: Anita Marriott, Olympia, WA (US); Victor J. Marriott, Olympia, WA (US)

(73) Assignee: A Better Way, Inc., Olympia, WA (US)

( * ) Notice: Subject to any disclaimer, the term of this patent is extended or adjusted under 35 U.S.C. 154(b) by 24 days.

(21) Appl. No.: 10/123,738

(22) Filed: Apr. 16, 2002

(65) Prior Publication Data

US 2003/0192823 A1 Oct. 16, 2003

(51) Int. Cl.[7] ............................ B01D 35/02; A47J 42/56
(52) U.S. Cl. ......................... 210/470; 99/340; 99/410; 99/413; 210/474
(58) Field of Search ................................ 210/464–470, 210/474, 475; 99/340, 403, 410–418

(56) References Cited

U.S. PATENT DOCUMENTS

| | | |
|---|---|---|
| 434,452 A | 8/1890 | Matthews |
| 857,329 A | 6/1907 | Carey |
| 1,053,780 A | 2/1913 | Brooks |
| 1,183,468 A | 5/1916 | Knight |
| 1,214,800 A | 2/1917 | Link |
| 1,325,613 A | 12/1919 | Beebe |
| 2,133,724 A | 10/1938 | Smulski |
| 2,284,342 A | 5/1942 | Quinby |
| 2,400,462 A | 5/1946 | Hassel |
| 2,507,159 A | 5/1950 | Holgren et al. |
| 2,520,382 A | 8/1950 | Conrad et al. |
| 2,541,094 A | 2/1951 | Pesenti |
| D172,838 S | 8/1954 | Olswang |
| D179,912 S | 3/1957 | Marshall |
| D183,302 S | 8/1958 | Dumbeck |
| D188,730 S | 8/1960 | Berman |
| 3,065,855 A * | 11/1962 | Edwards ............... 210/469 |
| 3,240,348 A | 3/1966 | Serio |
| 3,289,849 A * | 12/1966 | Livingston et al. ..... 210/469 |
| D237,032 S | 10/1975 | Monteal |
| 4,220,534 A | 9/1980 | Perry |
| 4,452,581 A | 6/1984 | Panehal |
| D313,727 S | 1/1991 | Gamez |
| D318,078 S | 7/1991 | Laib et al. |
| 5,031,517 A | 7/1991 | Yen |
| 5,178,761 A | 1/1993 | Mohun |
| 5,615,607 A | 4/1997 | Delaquis et al. |
| 5,653,881 A | 8/1997 | Bruss et al. |
| 5,826,494 A | 10/1998 | Wang |
| 5,957,038 A * | 9/1999 | Shimazaki ............... 99/340 |
| 6,092,670 A | 7/2000 | Marriott |
| 6,546,849 B1 * | 4/2003 | Shimazaki ............... 99/413 |
| 6,568,314 B1 * | 5/2003 | Stepanova ............... 99/340 |
| 2003/0015534 A1 * | 1/2003 | Lown et al. |

* cited by examiner

Primary Examiner—Joseph Drodge
(74) Attorney, Agent, or Firm—Kunzler & Associates (57) ABSTRACT

There is therefore provided devices that are used for straining liquid from solid food. Specifically, there is a food strainer that fits a multiple of pot and pan sizes and securely couples to those various size devices. There is a food strainer that provides for reduced exposure for the use to harmful steam during the act of straining food. There is a food strainer that provides for a more balanced handling of the heavy pot or pan during the act of straining.

20 Claims, 4 Drawing Sheets

FOOD LIQUID STRAINER FOR COOKING

FIELD OF THE INVENTION

The invention is generally related to devices that are used for straining liquid from solid food. Specifically, there is a food strainer that fits a multiple of pot and pan sizes and securely couples to those various size devices. More particularly, there is a food strainer that provides for reduced exposure for the user to harmful steam during the act of straining food. Additionally, there is a food strainer that provides for a more balanced handling of the heavy pot or pan during the act of straining.

BACKGROUND OF THE INVENTION

Ever since pots and pans have been used to cook food, food preparers have needed to remove liquid from the solid food before emptying the food contents from the container. This simple act of straining food, has a number of hazards that have caused many injuries. For example, when food is boiled, hot steam raises from the pot. If no strainer is used when the water is poured out of the pot, the users arms are typically positioned on either side of the pot to hold the handles, thus the users arms and hands are exposed to the dangerous steam. If a typical strainer is used, as is illustrated in U.S. Pat. No. 4,220,534, it is placed over the pot while the user holds the strainer handle and the pan handle, which can be quite a trick to do, and thus increasing the risk of dropping the pot from the complexity of holding all the handles. Thus, there is a need for a strainer that provides for reduced exposure for the user to harmful steam during the act of straining food.

Additionally, there is the problem of balancing this pan when a user tips it over to pour the liquid contents out to separate it from solid food contents. For example, if there is a typical pan, there is a single long handle, such as illustrated in U.S. Pat. Nos. 4,220,534 and 2,520,382. Filling that pan full of hot grease and heavy meat, and the act of tipping that pan over with only the thin handle requires a great deal of strength in the hands and arms. If a user lacks the required strength, there is a risk of dropping the pan and its dangerously hot grease and food onto themselves. Add the difficulty of holding a strainer to that act and it is understandable that every year, literally tens of thousands of cooks are injured due to dropped pans. Thus, there is a need for a strainer that provides for a more balanced handling of the heavy pot or pan during the act of straining.

Another problem with using liquid strainers is that one strainer often does not fit effectively over many sizes of pots and pans. Where there is not a good fit between the two devices, the strainers can fall of the pot or pan thus causing the food to pour down the drain, the pot could be dropped, and the user could be injured. Thus, there is a need for a strainer that fits a multiple of pot and pan sizes and securely couples to those various size devices.

There are a number of prior patents which disclose food straining devices. Examples of these patents, each of which is incorporated by reference for its supporting teachings, are as follows:

U.S. Pat. No. 4,153,045 is a cooking utensil in the form of a pan having upstanding walls and a lid or cover supportable by the upper edges of the walls and which is dimensioned to fit into the interior of the pan for use as a food scoop or spatula. In its preferred embodiment, the cover is generally planar and perforated enabling its use as a sieve for the draining of cooking fluids from food supported thereon and as a porous cover which promotes condensation of cooking vapors for basting the food being cooked in the pan.

U.S. Pat. No. 4,220,534 is a detachably secured food straining screen is formed with lower and upper peripheral grooves for pressure fitting engagement with the top of a cooking pot and the bottom of a cover for that pot, respectively.

U.S. Pat. No. 5,035,800 is a strainer which may be adapted to fit over an opening of a variety of food storage and preparation containers comprising a flexible matrix, a flexible cord which is slidably disposed within a conduit, said conduit being located along the perimeter of said matrix and having an opening through which the ends of said cord protrude, and a means for releasably engaging the ends of said cord, wherein after said strainer is placed over the opening of the container, the ends of said cord are pulled through said engaging means to adapt the circumference of the conduit to that of the container, said cord being engaged when said conduit contacts the container.

U.S. Pat. No. 6,092,670 is a steam pan manipulation device (16) is provided for handling stainless steel pans (10), commonly known as steam pans or hotel pans, of varying sizes as found in commercial restaurant, catering, and hotel applications for use in steam tables. Use of the device (16) permits the worker to safely carry a tray full of liquid without sloshing, since the center of gravity of the liquid is lower than the point of carrying. Furthermore, the steam pan manipulation device (16) features apertures of an appropriate size, so that the device may be also used as a strainer for separating liquid from the content of the tray while retaining solid content in the tray.

Other patents also teaching straining devices for food are U.S. Pat. Nos. 3,240,348, 2,541,094, 2,520,682, 2,507,159, 2,400,642, 2,284,342, 2,133,724, 1,325,613 and 1,214,800.

While the foregoing patents disclose improvements in the area of food straining devices, none of these patents disclose, either by themselves or in combination with each other, the invention as described and claimed in the forgoing specification, drawings and claims.

SUMMARY OF THE INVENTION

There is therefore provided devices that are used for straining liquid from solid food. Specifically, there is a food strainer that fits a multiple of pot and pan sizes and securely couples to those various size devices. There is a food strainer that provides for reduced exposure for the user to harmfull steam during the act of straining food. There is a food strainer that provides for a more balanced handling of the heavy pot or pan during the act of straining.

There has thus been outlined, rather broadly, the more important features of the invention so that the detailed description thereof that follows may be better understood, and so that the present contribution to the art may be better appreciated. There are, of course, additional features of the invention that will be described hereinafter and which will form the subject matter of the appended claims. Those skilled in the art will appreciate that the preferred embodiment may readily be used as a basis for the designing of other structures, methods and systems for carrying out the several purposes of the present invention. It is important, therefore, that the claims are regarded as including such equivalent constructions since they do not depart from the spirit and scope of the present invention.

Therefore, there is a food strainer, for straining liquid from solid food from a food container, comprising: a base, having a top and bottom surface, and back, front and side edge, also having a center line that divides the base into even back and front edges; a handle, coupled to the base proximate the back edge and extending above the top surface of the base, and positioned with equal parts straddling the center line of the base; a fin, positioned proximate the handle and coupled to the base proximate the back edge, and extending below the bottom surface of the base, and positioned with equal parts straddling the center line of the base; and a first and second coupling, positioned on the front edge of the base, and positioned so the first coupling is on one side of the center line and the second coupling is on another side of the center line.

In addition, the food strainer has the first and second couplings are equal distance from the center line. The handle and fin form an angle between them that ranges from about 10 degrees to about 155 degrees. The first and second couples have: a receiver section, coupled to the base, designed to receive a lip of a pot; a tab, extending from the receiver section, forming a angle that is not perpendicular to the base. The base includes a plurality of openings formed near the front edge to allow liquid to escape from a pot that is being strained. The front edge of the base forms an arc and the side edges form parallel edges extending parallel to the center line.

Additionally there is a food strainer, comprising: base, forming a major plane; a handle, coupled to the base and extending above the major plane; a fin, positioned proximate the handle, coupled to the base, and extending below the major plane; and a coupling, coupled to the base opposite to the handle, and designed to enable holding of a pot lip thereby. The food strainer is made of a heat resistant material or a heat transmitting material, or a combination of both.

Further, the purpose of the abstract is to enable the U.S. Patent and Trademark Office and the public generally, and especially the scientists, engineers and practitioners in the art who are not familiar with patent or legal terms or phraseology, to find out quickly from a cursory inspection the nature and essence of the technical disclosure of the application. The abstract is neither intended to define the invention of the application, which is measured by the claims, neither is it intended to be limiting as to the scope of the invention in any way.

BRIEF DESCRIPTION OF THE DRAWINGS

The present invention will be understood more fully from the detailed description given below and from the accompanying drawings of the preferred embodiment of the invention, which, however, should not be taken to limit the invention, but are for explanation and understanding only.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENT(S)

By way of background information, it is assumed that one skilled in the art of food preparation and in the use of cooking tools and appliances will be familiar with the process undertaken when straining liquid from solid food, which are both located in a pot or pan. Specifically, and by way of illustration only, solid food, like noodles, are placed in a pot of boiling water to soften the noodles. Once the noodles reach the proper texture, the pot is removed from the heating appliance and the boiling water is poured out of the pot while maintaining the noodles within the pot. Obviously, the pot needs to be tipped so that the top of the pot is angled toward a sink sufficient to allow the liquid to be poured from the pot while maintaining the noodles within the pot. Typical prior art methods incorporate placing the pot opening next to the sink edge and leaning the pot top against the sink and tipping or raising the bottom of the pot sufficiently to pour the water out. One of the main reasons for employing this method is that the pot often too heavy to handle in this position and the sink is used to support some of the weight during the straining operation. Another reason is that the sink edge or wall is used to prevent the noodles form spilling out of the pot. A skilled artisan knows the problems with this method.

Another method well understood by skilled artisans incorporates the use of various prior art strainers that are placed over the pot opening and pouring the water out through screens or holes while maintaining the noodles within the pot. Again, the various problems existing with these prior art devices are understood by a skilled artisan.

Figure 1:
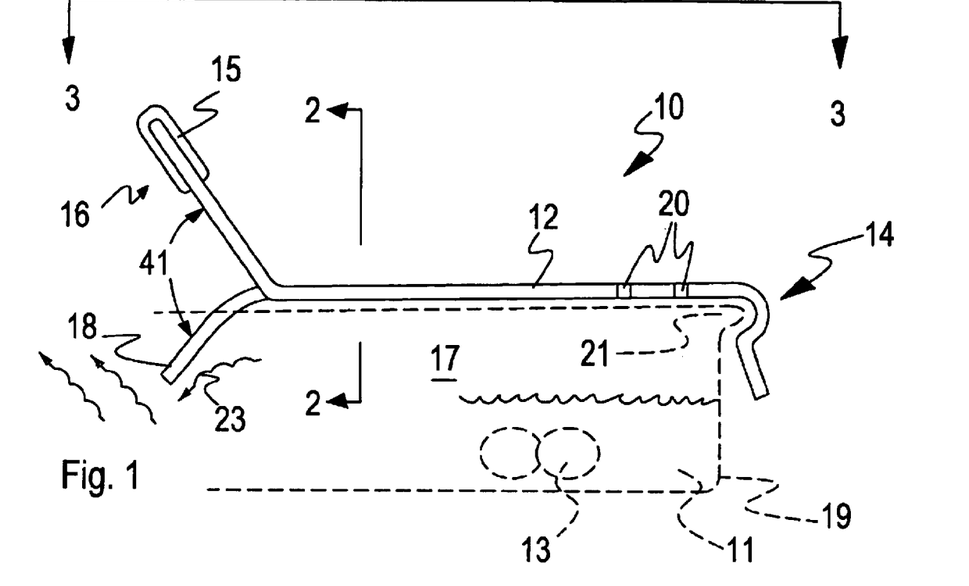
FIG. 1 illustrates a side view according to the present invention.
Figure 2:
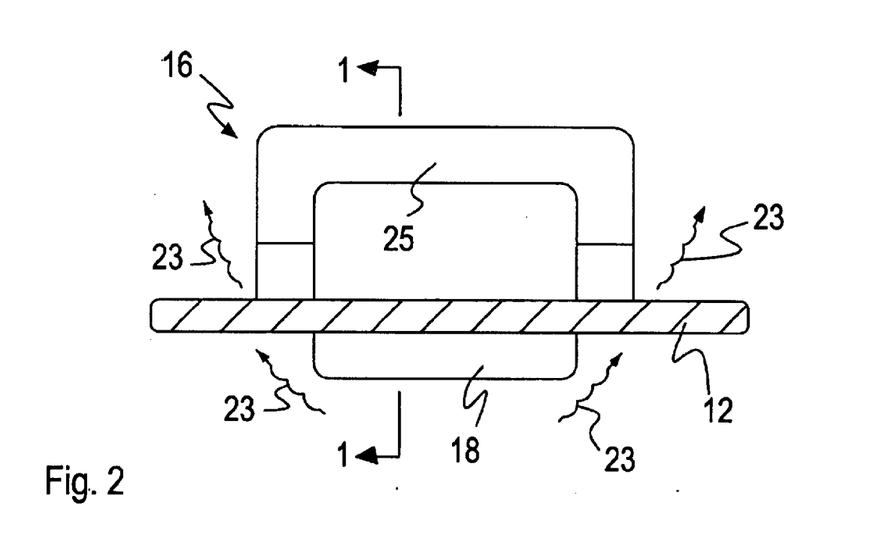
FIG. 2 illustrates a front sectional view taken from the sectional line shown in FIG. 1.
Figure 3:
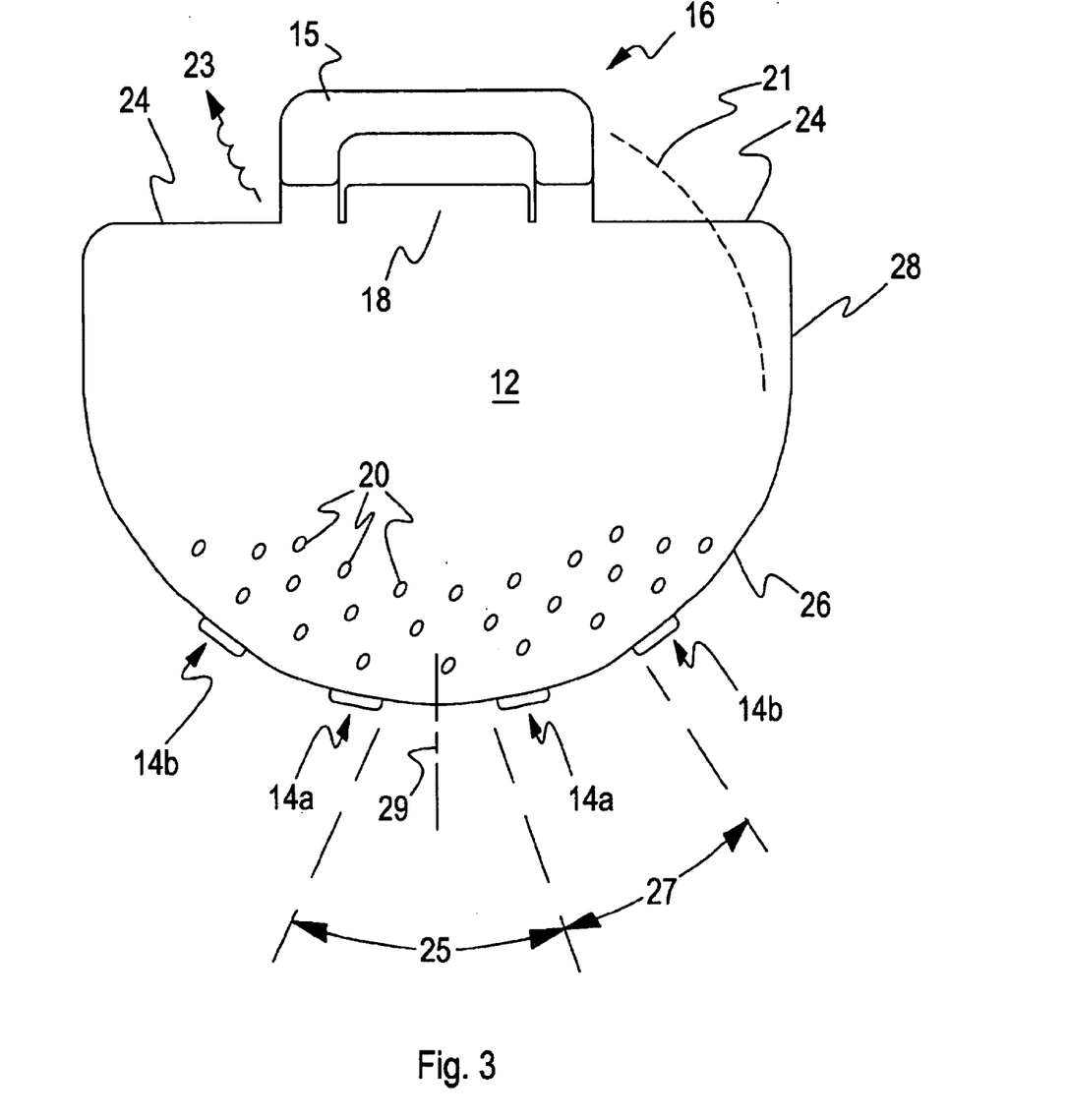
FIG. 3 illustrates a top view taken from the line shown in FIG. 1.

Referring generally to FIGS. 1, 2 and 3, there is illustrated a side, a sectional front and a top view according to the present invention. The dashed lines are representations of a pot or pan 19 that has a cavity 17 and a lip 21. In the cavity 17 there is a liquid 11 and solid food 13. There is also illustrated a strainer 10 that has many unique features. There is a base section 12 that has at least one and preferably several couplings 14 positioned around a front edge 26 of the strainer 10. The illustration clearly shows that the base 12 is flat and has several distinct features to be discussed below. The base has the purpose of retaining solid food 13 while allowing the liquid 11 to be poured through holes 20 and from the pot 19 during the straining operation.

It is particularly noted that the couplings 14 are uniquely positioned about the base 12 periphery. Center line 29 bisects angle 25, which is taken from the inside edges, closest to the center line 29, of the couplings 14a (FIG. 3). Angle 25 typically may range from about as little as 5 degrees to as much as 100 degrees or more. One purpose of that positioning of the couplings 14 is to allow for a variety of pan 19 sizes, and especially the different circumferences of pots 19, to fit within the couplings 14. Another purpose of the positioning is to allow for an even balance of the pot 19 while it is being suspended by the couplings 14 when the pot 19 is being tipped over in the straining operation. Thus, couplings 14a predominantly serve as the main weight holding couplings 14 when the pot 19 is tipped. So you do not want the couplings 14a to be too wide or too close together to prevent causing an unstable position much like a fulcrum would cause if there were a single coupling 14a.

It is also noted that there are two additional couplings 14b which predominantly serve as retaining couplings 14. In other words, if the couplings 14a were too close together for a given size of pot 19, there could be a situation where the pot 19 would want to roll off the supporting couplings 14a in a sideways rolling motion. Thus, the added couplings 14b are predominantly positioned to not only support the weight of the pot 19, but to mainly prevent the separation of the pot 19 from the strainer 10 caused from a potentially rolling-type action. In other words, they predominantly add an additional stabilizing force to the coupling operation. It is noted that angle 27 is taken from the edges closest to the center line 29, and can have a range from approximately as little as 5 degrees to as high as 100 degrees or more.

The strainer 10 also has a handle 16, extending at an angle from the base 12 as seen from the side. Most any angle will be sufficient, just so the handle allows for a user to have their hand elevated up and away from the hot pot 19 edge or rim 21 during straining operations. The handle 16 may have a cover 15 for thickening the handle 16 for ease of gripping or for insulating the users hand from the potential heat being transmitted from base 12 in the case where the base 12 is made of a heat conducting material, like metal.

It is noted that the handle 16 is formed in a U-shape with the legs of the U-shape being anchored to the base 12 on opposite sides of the center line 29. The purpose of this design is similar to the purpose of the connectors 14a, and 14b, and that is to increase the ease of both balancing and supporting the often heavy pot 19. In particular, and in reference to FIG. 4, there is illustrated a side view of the motion of the center of gravity (CG) 40, illustrated as a vector, taking place during a straining operation, removing the liquid 11 from the pot 19. Specifically, as the result of the angle and position of the handle 16 and couplings 14, the CG 40 moves forward relative to the front of the pot 19 (where liquid 11 is being poured from) as the pot 19 is tilted. This is illustrated by the four successively tilted pot 19 positions, which show the CG 40 moving toward the front of the pot 19 as the tilting angle is increased.

Figure 4:
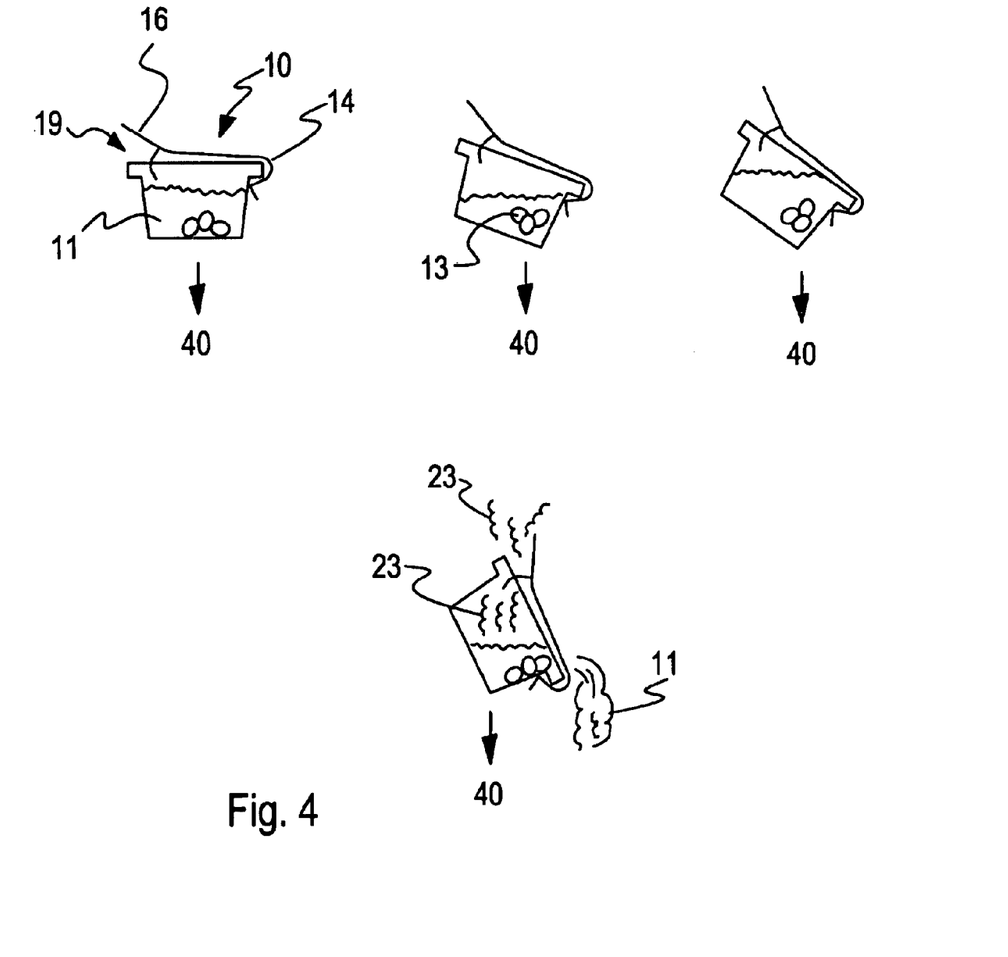
FIG. 4 illustrates a side view of successive positions of a pot employing the present invention during a straining operation.

Advantageously, the angle of the handle 16 relative to the base 12 is uniquely designed to be approximately in a vertical orientation once the optimum and/or maximum straining tilt of the pot 19 is reached, thus, achieving an optimum balance and ease of holding the weight for the user.

Additionally, in the optimum straining position, the CG 40 may be positioned near the handle 16 when the pot 19 is in a fully tilted position. This is illustrated in the last drawing of FIG. 4, where the CG 40 is approximately positioned directly below the handle 16 again achieving an optimum balance and ease of holding the weight. Finally, skilled artisans also will realize that this same CG 40 will traverse a line that goes along the center line 29 of the strainer 10 during the straining operation when viewed from the top of the strainer 10 (not illustrated). Thus, further illustrating the advantage of having the handle 16 and couplings 14 positioned on either side of the center line 29 for added stability during straining operations.

It is further pointed out that the dimensions of the pot 19 will greatly affect some of these CG 40 dynamics. For example, a large and very deep pot 19 may not have the CG 40 line reach to the front of the pot 40 as illustrated. Nonetheless, the CG 40 will traverse the center line 29 that is balanced between the sides of the handle 16 and the couplings 14.

Most uniquely, there is a steam fin 18, that is positioned near the handle 16, extends below the top primary surface of the base 12 and extends back from the base 12 in an angled position relative to the base 12. The angle 41 of the fin 18 is calculated from the position of the handle 16. The angle 41 may be from about 10 degrees to as much as about 155 degrees as illustrated in FIG. 1. A skilled artisan will easily understand the purpose of the fin 18, which is to divert harmful steam 23 from the handle 16 area during straining operations as illustrated in FIGS. 1, 2 and 4. In particular, as seen in FIG. 2, the steam 23 will be diverted to the right and left of the handle 16 along the back edge 24.

The base 12 also has holes 20 positioned around a front edge 26. The 20 holes have the purpose of allowing liquid 11 to be separated from the solid food 13 during the straining operation. Any suitable arrangement and size of holes 20 is contemplated with this invention.

The strainer 10 has straight side edges 28 and a straight back edge 24. The back edge 24 extends from the intersection with straight side edge 28 and extends to the intersection with the handle 16. The purpose of having the straight sides 28 is to increase the length of the back edges 24 over what it would be if the whole periphery of the base 12 were to continue to have the same arc as the front edge 26. By having larger back edges 24, it is possible to have the lip 21 of the pot 19 rest against the back edge 24. Thus, the base 12 is prevented from entering into the pot cavity 17 when the strainer 10 is laid upon the top of the pot 19. Therefore, there are at least four points of contact between the strainer 10 and the pot 19 top, i.e. two back edges 24, and two couplings 14a. It is noted that both sets of point of contact, couplings 14 and back edges 24, are positioned on opposite sides of the center line 29. This positioning also contributes to the stability of the strainer 10-pot 19 interface during the movement of the straining operation. The back edge 24 also has the effect of preventing the front edge 26 from being lifted off of the lip 21 of the pot 19 during straining operation. This separation would occur if the back edge 24 were to dip below the edge of the pot 19. The front edge 26 contact with the pot lip 21 is important in preventing solid food 13 from escaping along or through that front section during straining operations. This is particularly important when the solid food 13 is a noodle, which is smaller in dimension than some other food.

Figure 5:
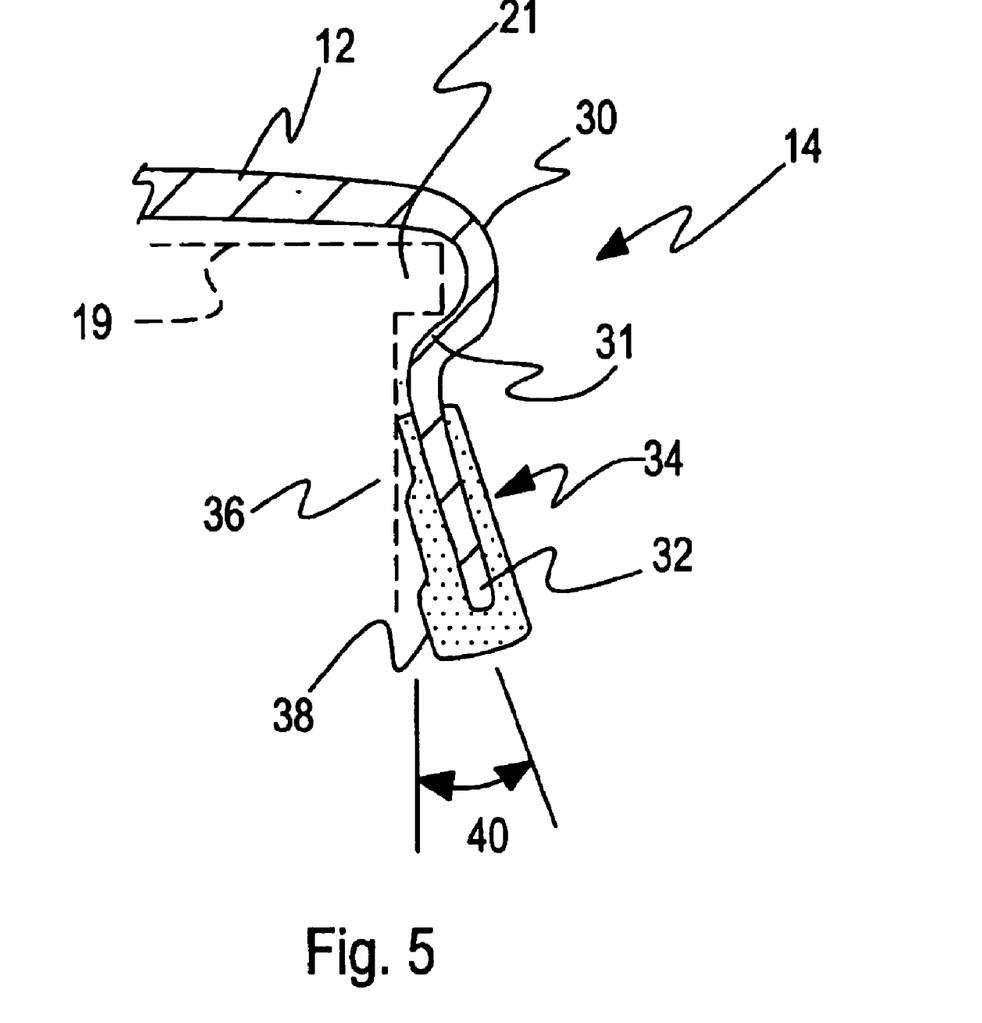
FIG. 5, illustrates a cross-sectional enlarged view of the pot and pan coupling feature 14.

Referring now to FIG. 5, there is illustrated an expanded view of the couplings 14. In particular, coupling 14 has a receiver section 30, which is designed to receive a lip 21 of a pot or pan 19. The receiver 30 is illustrated as a rounded section, though any shape that will securely hold or attach to a front top edge of a pot or pan 19 is contemplated with this invention. An important feature of the receiver 30 is that there is a ledge section 31 that can fit under the pot lip 21. This has the purpose of assisting in the lifting of the pot 19 and retaining the pot 19 during the straining operation.

Another optional feature of the coupling 14 is the tab 32. This has the purpose of stabilizing the pot 19 during straining operations. It is noted that the tab 32 is not positioned in a vertical orientation, but has a slight angle 40. Angle 40 allows for various pot 19 designs, especially those with bowed or rounded outward sides, to fit within the coupling 14.

Optional cushion 34 is positioned over tab 32, and may have a series of steps, extending from a smaller step 36 to a larger or thicker step 38, positioned on the inside surface of tab 32. The purpose of the cushion 34 is to assist in gripping the surface of the pot 19 and to prevent scratching of the pot 19. The cushion steps 36, 38 may be of such a dimension, size, or positioning as to prevent the pot 19 sides from ever contacting any portion of the tab 32.

In an alternative design, it is contemplated to eliminate the tab 32 and only have a receiver 30. If this were the case, a cushion 34 may be placed over the receiver 30 for the same purpose a described above.

VARIATIONS OF THE INVENTION

In addition to the previously indicated variations, numerous other modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, manner of operation, assembly, and use may be made without departing from the principles and concepts set forth herein.

It is noted that a round configuration for the strainer 10 is illustrated, however, there are many contemplated shapes. A square shape would be most beneficial for square pot or pans as are commonly used in industrial environments. Additionally, oval, or triangular shapes, for example, are further illustrative of the many variety of shapes that a skilled artisan would contemplate once understanding the several different patentable features described in this applications. Particularly, triangles could be used on the corners of square pans, for example.

The handle 16 is illustrated as a somewhat squared U-shape, however most any shape that is balanced on either side of the centerline 29 is contemplated. For example, a rounded U-shape to a skilled artisan is completely interchangeable and merely illustrates that there are many other designs that would work.

The fin 18 is illustrated as a single plate extending from the base 12 and located between the edges of the handle 16. However, a skilled artisan will realize that this design is a result of the initial designs being fabricated from metal. If, as expected, the strainer 10 is made of heat resistant plastic, there would be any innumerable designs that could be developed to achieve the desired benefits as described and understood by those skilled artisans.

What is claimed is:

1. A food strainer, for straining liquid from solid food from a food container, comprising:
    a) a base having a top surface, a bottom surface, a back edge, and a front edge;
    b) a handle coupled to the base proximate the back edge and extending above the top surface of the base;
    c) a fin positioned proximate the handle and coupled to the base proximate the back edge and extending below the bottom surface of the base and configured to divert steam away from sides of the handle as the steam escapes from the food container; and
    d) a first coupling and a second coupling coupled to the base proximate the front edge.

2. The food strainer of claim 1, wherein the first and second couplings are equal distance from a center line that divides the front edge and back edge of the base into equal first and second front edge sides and equal first and second back edge sides, respectively.

3. The food strainer of claim 1, wherein the handle and fin form an angle between them that ranges from about 10 degrees to about 155 degrees.

4. The food strainer of claim 1, wherein each of the first and second couplings has a receiver section, coupled to the base, designed to receive a lip of a pot.

5. The food strainer of claim 4, wherein each of the first and second couplings has a tab, extending from the receiver section, forming an angle that is not perpendicular to the base.

6. The food strainer of claim 1, wherein the food container is a pot and the base includes a plurality of openings formed near the front edge to allow liquid to escape from a pot that is being strained.

7. The food strainer of claim 1, wherein the front edge of the base forms an arc and the side edges form edges are parallel to a center line and extend from the front edge to the back edge.

8. The food strainer of claim 1, wherein the first coupling and second coupling are joined across a center line of the base.

9. The food strainer of claim 1, wherein the fin is configured to divert steam away from a user's hand during a straining operation.

10. The food strainer of claim 1, wherein the base has one of a triangular, a quadrilateral, and at least a partially circular shape.

11. The food strainer of claim 1, wherein the handle is positioned with equal parts straddling a center line of the base.

12. The food strainer of claim 1, wherein the fin is positioned with equal parts straddling a center line of the base.

13. The food strainer of claim 1, wherein the base has side edges and the width of the base between the side edges is greater than the width of the than the width of the food container.

14. A food strainer adopted for use with a food container, comprising:
    a) a base, forming a major plane;
    b) a handle, coupled to the base and extending above the major plane;
    c) a fin positioned proximate the handle, coupled to the base, and extending below the major plane configured to divert steam away from sides of the; and
    d) a coupling coupled to the base opposite to the handle and designed to enable holding of a lip of the container thereby.

15. The food strainer of claim 14, wherein the food strainer is made of a heat resistant material.

16. The food strainer of claim 14, wherein the food strainer is made of material that conducts heat.

17. A food strainer, comprising:
    an attachment means for attaching the strainer to a food container;
    a straining means for allowing liquid to pass from the food container through the strainer while retaining solid food in the food container;
    a holding means attached to the strainer for lifting the strainer and the food container in order to tilt the food container into a straining position; and
    a steam diversion means for diverting steam away from sides of the holding means in order to protect a user's hand from the steam as it escapes the food container.

18. The food stainer of claim 17, wherein the holding means is located and oriented to allow the user to perform a straining operation without placing the holding means in a steam path.

19. The food stainer of claim 18, wherein the steam path is a first steam path that originates from a set of straining holes near an extremity of the straining means opposite the holding means.

20. The food stainer of claim 18, wherein the steam path is a second steam path that escapes from beneath the straining means near the holding means and is diverted by the steam diversion means.

* * * * *

UNITED STATES PATENT AND TRADEMARK OFFICE
CERTIFICATE OF CORRECTION

PATENT NO. : 6,827,224 B2
DATED : December 7, 2004
INVENTOR(S) : Anita Marriott et al.

It is certified that error appears in the above-identified patent and that said Letters Patent is hereby corrected as shown below:

Column 1,
Line 21, "hot steam raises" should read -- hot steam rises --
Line 51, "can fall of the" should read -- can fall off the --

Column 2,
Line 5, "screen is formed" should read -- screen formed --
Line 22, "device (16) is" should read -- device (16) --
Line 47, "harmfull" should read -- harmful --

Column 3,
Line 15, "couplings are equal" should read -- couplings an equal --

Column 4,
Line 24, "the pot often" should read -- the pot is often --
Line 27, "noodles form" should read -- noodles from --

Signed and Sealed this

First Day of March, 2005

JON W. DUDAS
*Director of the United States Patent and Trademark Office*